US005760158A

United States Patent [19]

Schroeter

[11] Patent Number: 5,760,158
[45] Date of Patent: Jun. 2, 1998

[54] POLYURETHANE RUBBERS VULCANIZABLE BY PEROXIDES OR SULPHUR WITH IMPROVED LOW TEMPERATURE AND LOW GAS IMPERMEABILITY PROPERTIES

[75] Inventor: Axel Schroeter, Tampa, Fla.

[73] Assignee: TSE Industries, Inc., Clearwater, Fla.

[21] Appl. No.: 935,722

[22] Filed: Sep. 23, 1997

[51] Int. Cl.$^6$ ............................................. C08G 18/42
[52] U.S. Cl. ............................................. 528/83; 525/453
[58] Field of Search ................................. 528/83; 525/453

[56] References Cited

U.S. PATENT DOCUMENTS

| | | | |
|---|---|---|---|
| 3,043,807 | 7/1962 | Snyder et al. | 528/65 |
| 4,639,471 | 1/1987 | Hirai et al. | 521/172 |
| 5,516,549 | 5/1996 | Jasenof et al. | 427/178 |

*Primary Examiner*—Rachel Gorr
*Attorney, Agent, or Firm*—Larson & Larson, P.A.; James E. Larson

[57] ABSTRACT

Polyurethane rubbers are disclosed vulcanizable by peroxide and/or sulphur, the vulcanized rubber having improved low temperature compression set properties and low gas permeability. The vulcanizable polyurethane rubbers are made by mixing (A) 1.0 mol of polyester glycol having a molecular weight of 1500 to 7000 consisting of adipic acid and 2-methylpropanediol-1,3 in combination with cyclohexyldimethanol and/or propanediol. The mol ratio of methylpropanediol to cyclohexyldimethanol and/or propanediol can vary from 70 to 30 to 30 to 70%.

(B) 0 to 2.5 mols of a diol having a molecular wright of 60 to 200; and (C) 0.95 to 3.5 mols of diisocyanate with a molar ratio of isocyanate group in (C) to the isocyanate-reactive groups in (A) and (B) of 0.95 to 1.02.

8 Claims, No Drawings

5,760,158

POLYURETHANE RUBBERS VULCANIZABLE BY PEROXIDES OR SULPHUR WITH IMPROVED LOW TEMPERATURE AND LOW GAS IMPERMEABILITY PROPERTIES

BACKGROUND OF THE INVENTION

1. Field of The Invention

This invention relates to polyurethane rubbers. More particularly, it refers to improved polyurethane rubbers that are vulcanizable by peroxides or sulphur to produce polyurethane elastomers having low temperature and low gas permeability properties useful for making active hydropneumonic suspension system membranes.

2. Description of Prior Art

Polyurethane rubbers have been used in ever increasing quantities in a wide variety of industrial applications. Since they are made up from discrete flexible segments (polyesters, polyethers), chain extenders, (diamines, diols) and diisocyanates, their properties can be adjusted in broad limits.

In particular, peroxide vulcanizable polyurethane rubbers based on polyesters are distinguished by high mechanical strengths, excellent resistance to oils and hydraulic fluids, and can withstand the elevated under the hood temperatures in automobiles.

One of the most interesting applications for polyurethane rubbers is as membranes for active hydropneumatic suspension systems. Currently used polyurethane rubbers for this application have either limited low temperature properties or their permeability to gas is not low enough. A need exists for polyurethane rubbers that have both good low temperature properties and low permeability to gas.

SUMMARY OF THE INVENTION

The polyurethane of this invention are vulcanizable by peroxides or sulphur or with both peroxide and sulphur to produce polyurethane rubbers that have both desirable low temperature properties and low permeability to gases. These vulcanizable polyurethanes have the following ingredients.

(A) 1.0 mol of a polyester glycol having a molecular weight of 1500 to 7000 consisting of adipic acid and 2-methylpropanediol-1,3 in combination with cyclohexyldimethanol and/or propanediol. The mol ratio of 2-methylpropanediol-1,3 to cyclohexyldimethanol and/or propanediol can vary from 70 to 30 to 30 to 70%;

(B) 0 to 2.5 mols of a diol having a molecular weight of 60 to 200; and (C) 0.95 to 3.6 mols of diisocyanate with a molar ratio of the isocyanate groups in (C) to the isocyanate-reactive groups in (A) and (B) (NCO/OH-molar ratio) of 0.95 to 1.02.

DETAILED DESCRIPTION OF THE INVENTION

The polyurethane elastomers of this invention maintain their desirable elastomeric properties after vulcanization even at temperatures down to minus 40° C. and also offer a nitrogen permeation of below $6.5^8$ cm$^{-2}$-sec$^{-1}$ atm$^{-1}$ at 80° C. The polyurethane rubbers have the following ingredients.

(A) 1.0 mol of a polyester glycol having a molecular weight of 1500 to 7000 consisting of adipic acid and 2-methylpropanediol-1,3 in combination with cyclohexyldimethanol and/or propanediol. The mol ratio of 2-methylpropanediol-1,3 to cyclohexyldimethanol and/or propanediol can vary from 70 to 30 to 30 to 70%;

(B) 0 to 2.5 mols of diol having a molecular weight of 60 to 200; and (C) 0.95 to 3.6 mols of diisocyanate with a molar ratio of the isocyanate groups in (C) to the isocyanate-reactive groups in (A) and (B) (NCO/OH-molar ratio) of 0.95 to 1.02.

The polyester glycols (A) contain, in polymeric form, adipic acid and 70 to 30 mol % of 2-methylpropanediol-1,3 and 30 to 70 mol % of cyclohexyldimethanol and/or propanediol. The polyester glycols (A) can be produced by standard processes, for example, by melt condensation from dicarboxylic acids and glycols at 180° to 230° C. Toward the end of the reaction, esterification can be accelerated by application of vacuum, use of entrainers and addition of catalysts.

To produce the polyurethane rubber according to the invention 0 to 2.5 mols of low molecular weight chain extenders are required per mol of polyester. These chain extenders (B) have molecular weights of 60 to 200, preferably 0.3 to 0.5 mols of butandiol-1,4, ethylene glycol, and/or bis-(2-hydroxyethoxy)-benzene or alternatively 0.1 to 2.5, preferably 0.2 to 1.2 mols of glycerol monoallylether or trimethylolpropane monoallylether are used.

As diisocyanates (C) conventionally known products are used. Preferably, 4,4-diisocyanatodiphenylmethane (MDI), toluylenediisocyanate (TDI), hexamethylenediisocyanate (HDI), or 4,4$^1$-diiocyanatodicyclohexylmethane ($H_{12}$MDI) are used. The molar ratio of the isocyanate groups in (C) to isocyanate-reactive groups in (A) and (3) (NCO/OH ratio) is 0.95 to 1.02, preferably 0.97 to 1.00.

By using MDI as the diisocyanate (C) the MDI as a constituent of the macro molecule is a suitable co-reactant for peroxide vulcanization by radical formation through the central methylene group.

By using TDI, HDI, $H_{12}$MDI, or TMXDI as the isocyanates (C) allyl groups have to be present in a quantity of 0.1 to 2.5 mols per mol of polyester glycol. These unsaturated components are being built into the structure by the use of OH functional compounds with a double bond as chain extenders, i.e., glycerol monoallyether or trimethylolpropane monoallylether in a quantity of preferably 0.1 to 1.5 mols per mol of polyester glycol. Obviously, mixtures of chain extenders and diisocyanates also can be used.

The polyurethane rubber can be produced either in the melt by using a mixer head or in a reaction extruder. The reactants can be reacted simultaneously or in succession at temperatures of 70° C. to 220° C. Polyaddition in solvents such as toluene, methyl ethyl ketone or ethyl acetate is also possible. The solvents are removed at the end of polyaddition under heat and vacuum, i.e., in an evaporation extruder.

For the final use, these polyurethane rubbers are mixed with fillers, stabilizers, pigments and additional crosslinking components such as sulphur, peroxides, plus the necessary accelerators and/or co-agents. These mixers are then vulcanized in a standard rubber process by heat treatment during and/or after shaping. The shaped and vulcanized articles then yield the desired excellent low temperature properties and a very low permeation to gas.

The following examples set forth the ingredients of the polyurethane vulcanizable rubbers and a comparison in physical properties between the vulcanized polyurethane rubber products produced by the teaching of this invention and prior art vulcanized rubbers.

Polyols

A-1 Hydroxyl polyester of adipic acid and 60 mol % of 2-methylpropanediol-1,3 and 40 mol % of cyclohexyldimethanol

MW: 3500

A-2 Hydroxyl polyester of adipic acid and 40 mol % of 2-methylpropanediol-1.3 and 60 mol % of propanediol
MW: 3500

A-3 Hydroxyl polyester of adipic acid and 70 mol % of ethandiol and 30 mol % of propanediol
MW: 2000

A-4 Hydroxyl polyester of adipic acid and 60 mol % of ethandiol and 40 mol % of butanediol 1,4.
MW: 2800

A-5 Hydroxyl polyester of adipic acid and 40 mol % of butanediol 1.4 and 60 mol % of 2-methanpropanediol 1,3
MW: 4000

Chain Extender

B Butanediol-1,4

Diisocyanate

C 4,4-diisocyanatodiphenylmethane

PRODUCTION OF THE POLYMERS

The polyester polyols (A-1 to A-5) are dewatered for 20 to 60 minutes at 90° C. under vacuum and then mixed with the chain extender B.

The diisocyanate C is added at about 80° C. and the mixture is stirred for about 90 seconds.

The exothermic reaction can raise the temperature to up to 140° C. The polyadduct is poured into metal cans and completely cured at 80° C. for 72 hours.

| Polymer | Polyester | Chain Extender | Diisocyanate |
|---|---|---|---|
| Polymer 1 | 1.0 mol A1 | 0.4 mol B | 1.38 mols C |
| Polymer 2 | 1.0 mol A2 | 0.4 mol B | 1.38 mols C |
| Polymer 3 | 1.0 mol A3 | 0.4 mol B | 1.38 mols C |
| Polymer 4 | 1.0 mol A4 | 0.4 mol B | 1.38 mols C |
| Polymer 5 | 1.0 mol A5 | 0.4 mol B | 1.38 mols C |

Production of Test Pieces 100 parts by weight of each of the polymers A-1 to A-5 are mixed on an open mill with 0.5 parts of stearic acid, 20 parts by weight of carbon black N990 and 6 parts by weight of Dicup 40C (40% active dicumylperoxide).

The compound is then vulcanized in a normal rubber press for 15 minutes at 170° C.

Compression Set Test (CS)

For the low temperature compression set test, 6 mm compression molded stoppers are being compressed by 25% for 24 hours at specified temperature, then relieved and their recovered thickness measured after 30 minutes at test temperature. The value gives the residual permanent deformation in percent.

Gas Permeation Test

Gas permeation co-efficient test has been determined in accordance to ASTM D1434-82 (nitrogen; Temperature 80° C.).

| Polymer | CS-10° C. | CS-20° C. | CS-30° C. | CS-40° C. | Permeation |
|---|---|---|---|---|---|
| Polymer 1 | 21% | 31% | 53% | 79% | $4.8^{-8}$ |
| Polymer 2 | 19% | 29% | 51% | 75% | $4.7^{-8}$ |
| Polymer 3 | 27% | 40% | 69% | 99% | $5.8^{-8}$ |

-continued

| Polymer | CS-10° C. | CS-20° C. | CS-30° C. | CS-40° C. | Permeation |
|---|---|---|---|---|---|
| Polymer 4 | 12% | 22% | 31% | 64% | $7.5^{-8}$ |
| Polymer 5 | 15% | 23% | 29% | 57% | $11.5^{-8}$ |

As shown, the examples according to the invention, Polymer 1 and Polymer 2, have the desired compression set values at low temperatures and also the required permeation co-efficient of less than $6.5^{-8}$; all other Polymers fail either in the low temperature behavior or in the gas permeation test.

Various changes, modifications and equivalent alterations in the teachings of the present invention can be contemplated by those skilled in the art without departing from the intended spirit and scope thereof. As such, it is intended that the present invention only be limited by the terms of the appended claims.

I claim:

1. A polyurethane rubber adapted to be vulcanizable by peroxide or sulphur or combination of peroxide and sulphur, the polyurethane rubber comprising a mixture of:
   (A) 1.0 mol of polyester glycol having a molecular weight of 1500 to 7000 consisting of adipic acid and 2-methylpropanediol-1,3 in combination with a second compound selected from the group consisting of cyclohexyldimethanol, propanediol and a combination thereof, the mol ratio of methylpropanediol to second compound varying from 70 to 30 to 30 to 70%;
   (B) 0 to 2.5 mols of a diol having a molecular weight of 60 to 200; and
   (C) 0.95 to 3.5 mols of diisocyanate with a molar ratio of isocyanate group in (C) to an isocyanate relative group in (A) and (B) of 0.95 to 1.02.

2. The polyurethane according to claim 1 wherein (B) is 0.1 to 0.8 mols of a diol selected from the group consisting of ethandiol, butanediol-1,4, and hexanediol-1,6.

3. The polyurethane according to claim 1, wherein (C) is 4,4'-diisocyanatodiphenylmethane.

4. The polyurethane according to claim 2, wherein (C) is 4,4'-diisocyanatodiphenylmethane.

5. The polyurethane according to claim 1 wherein (B) is 0.1 to 2.5 mols of a compound selected from the group consisting of glycerol monoallylether and trimethylolpropane monoallylether.

6. The polyurethane according to claim 1 wherein (C) is selected from the group consisting of toluylenediisocyanate, hexamethylenediisocyanate, and 4,4'-diisocyanatodicyclohexylmethane.

7. A polyurethane rubber adapted to be vulcanizable by peroxide or sulphur or combination of peroxide and sulphur, the polyurethane rubber comprising a mixture of 1.0% mol of polyester glycol having a molecular weight of 1500 to 7000 consisting of adipic acid and about 60 mol % of 2-methylpropanediol-1,3 in combination with about 40 mol % of cyclohexyldimethanol, about 0.4 mol % of butanediol-1,4 and about 1.35 mol % of 4,4'-diisocyanatodiphenylmethane.

8. A polyurethane rubber adapted to be vulcanizable by peroxide or sulphur or combination of peroxide and sulphur, the polyurethane rubber comprising a mixture of 1.0% mol of polyester glycol having a molecular weight of 1500 to 7000 consisting of adipic acid and about 60 mol percent of 2-methylpropanediol-1,3 in combination with about 40 mol % propanediol, about 0.4 mol % of butanediol-1,4 and about 1.35 mol % of 4,4'-diisocyanatodiphenylmethane.

* * * * *